United States Patent [19]

Comer

[11] 3,759,023
[45] Sept. 18, 1973

[54] MOWER SAFETY SHIELD
[75] Inventor: Robert C. Comer, Hopkins, Minn.
[73] Assignee: The Toro Company, Minneapolis, Minn.
[22] Filed: Mar. 6, 1972
[21] Appl. No.: 232,132

Related U.S. Application Data
[63] Continuation-in-part of Ser. No. 179,802, Sept. 13, 1971, abandoned.

[52] U.S. Cl.................. 56/320.1, 56/17.4, 56/320.2
[51] Int. Cl............................................. A01d 35/26
[58] Field of Search............... 56/17.4, 320.1, 320.2, 56/255

[56] References Cited
UNITED STATES PATENTS
3,501,902  3/1970  Dahl .................................. 56/17.4
3,226,920  1/1966  Gilbertson ...................... 56/17.4 X
3,522,694  8/1970  Horn................................. 56/17.4 X
2,942,400  6/1960  Sylvester.......................... 56/17.4 X Primary Examiner—Russell R. Kinsey
Assistant Examiner—J. N. Eskovitz
Attorney—Thomas A. Lennon et al.

[57] ABSTRACT

An annular free floating shield for a rotary mower which rides freely on the ground being traversed and completely surrounds the periphery of the mower housing to prevent objects from escaping therefrom, the shield being movable simultaneously with the mower and free to float vertically relative thereto in accordance with ground contours without at any time exposing the space between the housing and the ground so as to permit objects to escape therefrom.

12 Claims, 12 Drawing Figures

Patented Sept. 18, 1973 3,759,023

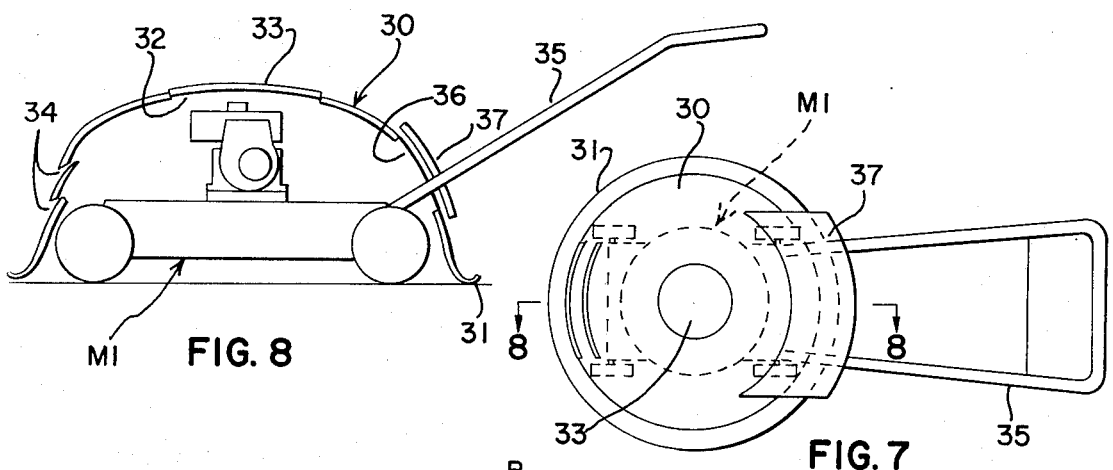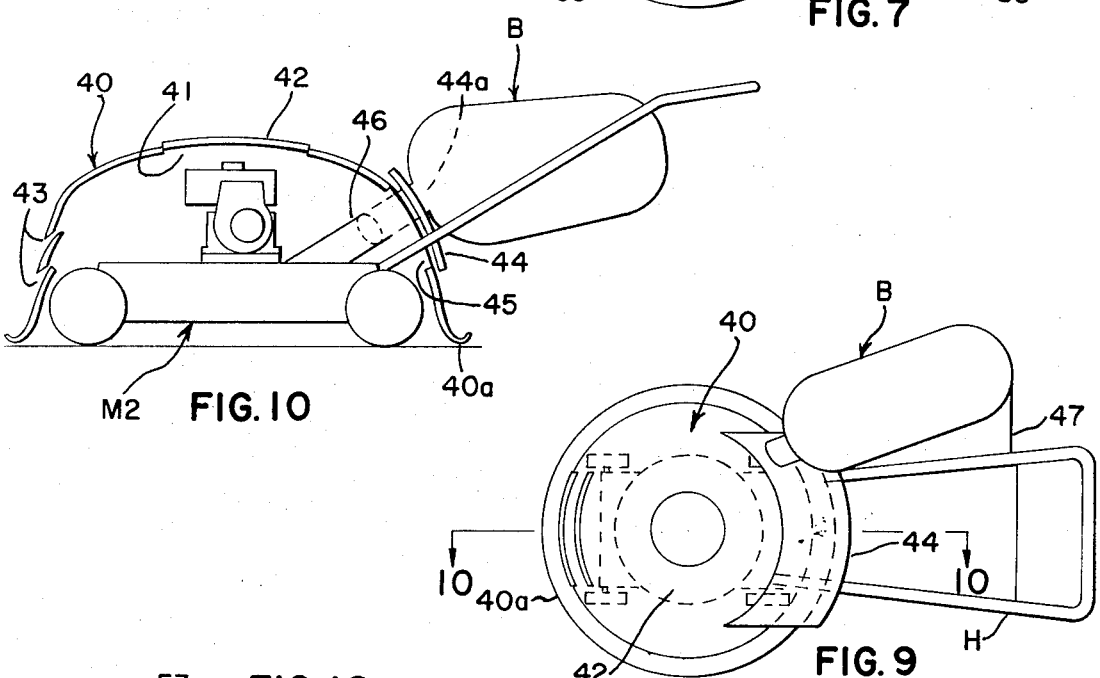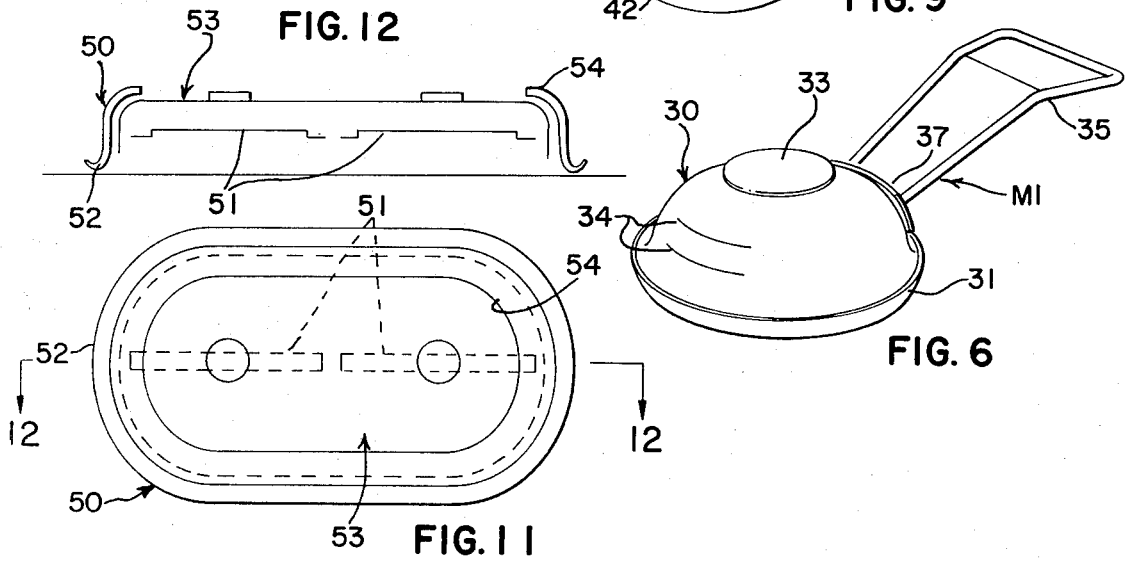

MOWER SAFETY SHIELD

One of the hazards associated with rotary mowers is that objects struck by the blade in the housing can escape from underneath the skirt of the housing at velocities sufficient to inflict serious injuries on and damage to persons and property within range of said objects.

Another hazard associated with rotary mowers is that hands and feet may accidentally enter the housing such as when the mower is approached by the operator or by a bystander while the mower is idling or during operation such as when the operator is moving towards him or if he should accidentally slip.

The primary object of this invention is to provide a safety device which will prevent objects from escaping from underneath the housing of a rotary mower, which will prevent inadvertent access to the housing interior by hands or feet, and which will at the same time permit the mower to function and operate properly so as to maximize the performance thereof.

These and other objects will be apparent from the following description and the drawings accompanying same, in which FIG. 1 is a perspective view of a rotary mower having one preferred embodiment of this invention mounted thereon;

FIG. 6 is a perspective view of a rotary mower having a shield constituting an alternate form of this invention in which the mower housing is completely encapsulated;

FIG. 7 is a top plan view of said alternate form;

FIG. 8 is a vertical longitudinal sectional view of said alternate form taken along the line 8—8 of FIG. 7;

FIG. 9 is a top plan view of a rotary mower having another alternate form of this invention which permits bagging while the mower housing is completely encapsulated;

FIG. 10 is a vertical longitudinal sectional view taken along the line 10—10 of FIG. 9;

FIG. 11 is a somewhat schematic top plan view of still another form of the invention as applied to a dual blade rotary mower; and FIG. 12 is a transverse vertical sectional view taken along the line 12—12 of FIG. 11.

Figure 1:
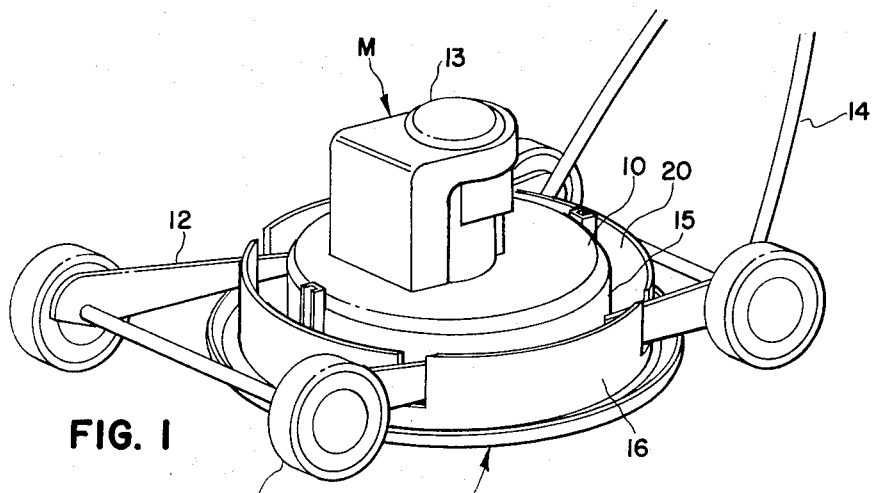
Figure 2:
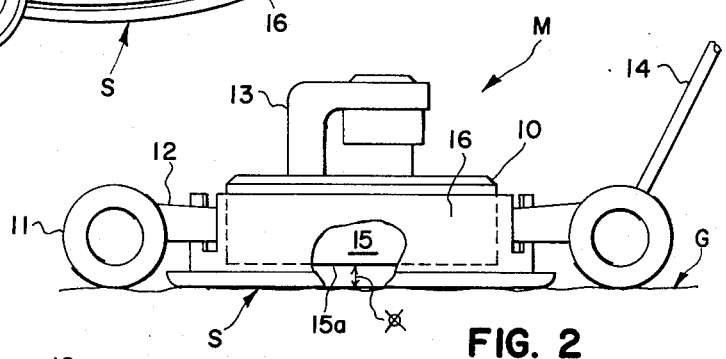
FIG. 2 is a side elevational view thereof with a portion of the safety shield broken away.
Figure 3:
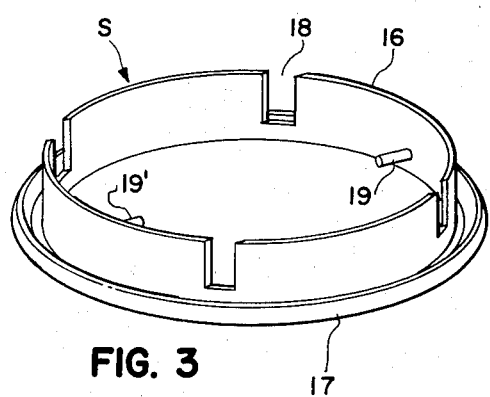
FIG. 3 is a perspective view of the safety shield of this invention removed from the mower of FIG. 1.
Figure 4:
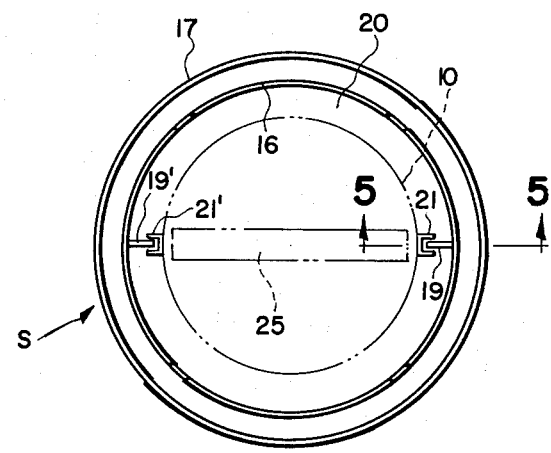
FIG. 4 is a top plan view of the safety shield and blade housing.
Figure 5:
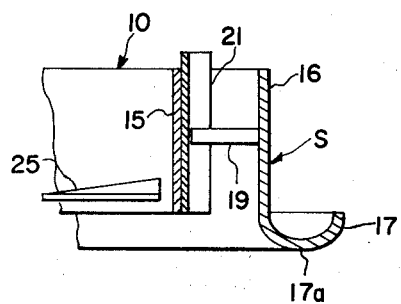
FIG. 5 is a vertical sectional view taken on the line 5—5 of FIG. 4.

Referring first to FIG. 1, a rotary mower M of generally conventional form is illustrated, which mower includes a generally circular blade housing 10 having a cutter blade 25 (shown in FIGS. 4 and 5) rotating therewithin in a horizontal plane. The mower also includes four ground wheels 11 which are connected with the housing 10 by means of brackets or wheel supports 12 extending forwardly and rearwardly from the housing 10 and supporting the ground wheels thereon. The mower also includes a motor 13 for driving the blade 25 and also the wheels if the mower is a self propelled unit. A handle 14 is also provided which extends upwardly and rearwardly from the mower housing for steering and directing the mower. Since the invention is not limited to a particular type of rotary mower, it is believed that further detailed description of the mower itself is unnecessary for a complete understanding of the invention, which invention lies in the safety shield S, rather than in the mower itself.

The mower housing 10 has a depending skirt 15, the lower marginal edge 15a being spaced a significant distance from the ground surface G over which the mower travels during use. It is this space between the skirt and the ground through which objects are thrown at high velocities. Also, it is this same space through which a foot or hand passes when inadvertent injury occurs thereto.

The safety shield S of this invention is designed to screen or shield this space around the entire periphery of the housing so that no objects such as sticks, stones, or wire can escape therefrom, and so that no objects such as hands or feet can enter thereinto. Thus, the shield prevents both access to and escape from the housing.

The safety shield S of this invention includes an annular upstanding wall 16, the lower end of which is provided with an outwardly extending upturned flange 17 about the entire periphery thereof. The lower face 17a of flange 17 is downwardly convexly curved to facilitate travel over the ground and enable the shield to readily ride over any obstructions and minimize its getting caught on and stopped by such obstructions.

The upper marginal edge of the wall 16 is provided with four slots 18 which are designed to receive the respective wheel supports 12 when the shield is mounted on the mower. A pair of interior spacing lugs 19-19' are provided which are diametrically opposed and extend towards each other from opposing faces of the wall 16. The lugs ride in vertical guide channels 21-21' respectively, which channels are secured to the housing skirt 15 with the open side facing outwardly towards its respective lug. These channels also guide the vertical movement of the shield. The lugs 19-19' also serve as pivot pins about which the shield S pivots during use, said pins providing a longitudinal horizontal pivot axis for said shield.

To mount the safety shield on the mower, the shield is simply placed upon the ground or other supporting surface and the mower is lifted thereinto with the wheel supports 12 being installed in their respective slots 18, so that when this simple operation has taken place the shield is suitably mounted on the mower as illustrated in FIG. 1. The spacing lugs 19-19' extend between the shield wall 16 and the skirt 15 of the housing to keep and maintain a uniform distance between the shield and the housing at all times, and the channels 25-25' cooperate with the lugs to maintain the desired relationship or relative positioning of the housing and shield and prevent relative rotational movement therebetween. The shield slots 18 are preferably of a size and shape which permits free vertical movement of the shield S relative to the mower under all circumstances, and prevents any hang up or binding of the shield on the mower in a fixed unnatural unsafe position in which a part of the space X might be exposed.

Because of the lugs, an annular space 20 is provided and maintained during use between the shield and the housing around the entire periphery thereof so as to maintain normal air flow into the housing.

The shield rides upon the ground independently of the mower itself and is free to fluctuate vertically relative to the mower to enable it to follow the ground contours independently of the mower. This enables the shield to be in contact with the ground at all times regardless of the attitude of the mower at any given time.

The forward and backward movement of the mower is transmitted to the shield through spacing lugs 19. The upturned flange 17 permits the shield to ride more smoothly over the ground and prevents it from becoming hungup on any irregularities or small objects stuck in the ground. It will also be noted that the wall 16 of the shield extends a substantial distance above the lower marginal edge of the skirt, a distance which will always permit the wall 16 to extend above or overlap the lower edge 15a of the skirt under virtually all operating conditions.

Although the mower illustrated does not have a discharge opening in the skirt 15, it will be appreciated that the shield of this invention can be readily designed so as to be used with a mower having such a discharge opening in the skirt of the housing.

Thus, the advantages of this invention are readily apparent. The safety shield can be made of a material such as durable plastic, and can be turned out as an integral piece at relatively little cost. The shield can be designed for use with new mowers, specifically designed to accommodate the safety shield, and can also be designed to be used with mowers already on the market. The shield completely encloses and shuts off the space between the skirt and the ground throughout the entire periphery thereof at all times so that no objects can escape therefrom and so that a hand or foot cannot accidentally enter the housing therethrough. Because of the shield's ability to float freely relative to the mower and to independently follow the ground contour, the space between the skirt and the ground is closed at all times, regardless of variation in the ground contour.

The preferred form of this invention, such as the one illustrated is one in which the shield completely encloses the housing about the entire periphery thereof. However, it is recognized that in some instances it may be difficult or impossible to design such a shield, particularly for an existing mower, which will be capable of enclosing the entire periphery and the design of the mower itself may necessitate a type of safety shield which encloses something less than 360° thereof. It is to be understood that such a shield is within the scope and contemplation of this invention.

This invention also envisions and covers a safety shield in which the wall thereof is located inside the skirt of the housing rather than externally thereof as illustrated and described.

Thus, it is to be understood that various changes and modifications of the preferred illustrated embodiment may be made within the spirit and scope of and without departing from this invention and it is therefore intended to cover all such modifications in the appended claims.

Alternate versions of the aforedescribed safety shield are somewhat schematically illustrated in FIGS. 6 through 10 inclusive. In these versions of the invention, the shields assume a dome-shaped configuration so that each shield in conjunction with the ground on which the mower travels, completely encloses or encapsulates the mower, so that nothing can reach the mower or be discharged from the interior thereof while the shield is in place.

The form shown in FIGS. 6–8 inclusive is essentially the same as that shown in FIGS. 9 and 10 except that the former is designed for use with a mower M1 which has no collection bag, and returns the clippings to the lawn, whereas the latter is designed for use with a mower M2 which discharges clippings into a collection bag.

In the version shown in FIGS. 6 through 8, the dome-shaped shield 30 is designed to completely enclose or encapsulate the mower, and is provided with an annular upturned flange 31 about the entire periphery thereof, so that it can ride freely over the ground being traversed, and accurately adapt itself to the changing contours thereof.

The top of the shield has an opening 32 which is provided with a service cover 33 which can be conveniently and readily removed for servicing or starting the mower itself without removing the shield from the mower.

The front of the shield is provided with a pair of air vent openings 34 to enable the engine to breather and to provide adequate air in the system to enable an updraft to be created so as to stand up the grass for more accurate cutting thereof.

Since the mower must have a steering handle 35, and opening 36 is provided in the rear of the shield 30 for receiving the handle, cover, and a baffler shield 37 is provided over the handle opening.

This cover 37 may be mounted in a variety of ways. In one version, it can be mounted directly on the dome 30, such as by a hinge connection, with an opening being formed therein to closely fit around the handle. In another version, as illustrated, the member 37 may be mounted directly on the mower handle, and be of such size and shape as to protect an operator standing behind the handle from any object thrown through the opening 36.

This form of the invention not only provides complete safety from thrown objects and minimizes accidental insertion of hands or feet into the blade housing when the mower is running, but it also offers the advantage of substantially reducing noise pollution by muffling the mower noises, including those of the engine, blade and traction drive. It also provides complete freedom of operation of the mower, and does not restrict or limit its mobility or operation in any way.

Plate 37, mounted as illustrated, is spaced a small distance from the dome 30 about the engine periphery of baffle 37 to provide additional air vents at the rear of the mower to provide additional operational air to the mower and interior of the dome.

In the form shown in FIGS. 9 and 10 in which bagging of the clippings is accomplished, the shield 40 is substantially the same as shield 30 in FIGS. 6–8, including the dome-shaped configuration, the annular upturned ground engaging flange 40a, the top opening 41 and service cover 42, and the pair of front air vents 43 as well as the baffle or shield 44 on the handle H covering handle opening 45.

However, in this version the mower M2 is provided with a discharge chute 46, through which the clippings are discharged from the system. The handle shield 44 includes an opening 44a therein through which the chute 46 extends, the outer end of the chute being attached to a collection bag, the bag being supported in part by the chute, and in part by the handle itself via supporting rod 47.

In the form illustrated in FIGS. 11 and 12, a shield 50 is provided for a rotary mower having a plurality of cutting blades 51 (two are shown) housed within a common blade enclosure or housing 53, with the entire system being slung from the underside of a lawn or garden tractor (not shown). To prevent the discharge of objects therefrom and prevent hands or feet from inadvertently entering the cutting housing, the shield 50 is annular in shape and completely encloses the blade housing and is provided with an annular curved upturned flange 52 to ride on and over the ground, and is also provided with an annular, generally horizontal collar portion 54 which overlies the outer periphery of the cutter blade housing.

The collar 54 not only provides additional protection from thrown objects, but also serves as a means for being raised to a transport position by the blade housing 53. Most rotary blade housings which are mounted on vehicles such as tractors are capable of being raised and lowered between operational and transport positions. As designed in FIGS. 11 and 12, the collar engaged by the housing 54 of the shield 50 will be engaged by the housing 53 and lifted from the ground thereby when the housing is raised. Conversely, it will be lowered to engage the ground and automatically adjust itself relative to the blade housing when the blade housing is lowered to operational position.

Thus, it can be seen that regardless of which form of the invention is adopted, the free-floating shield of this invention, by following the ground contour on which it continuously rests, continuously shields the open area between the bottom edge of the housing skirt and the ground and prevents any object from escaping and doing damage to persons or property.

Each form of the invention permits bagging, including the completely encapsulated form of FIGS. 9 and 10, which permits discharge of the clippings into bag B.

It is to be understood that various changes and modifications of the preferred illustrated embodiment may be made within the sirit and scope of and without departing from this invention and it is therefore intended to cover all such modifications in the appended claims.

What is claimed is:

1. A rotary mower included in combination with ground engaging safety shield said shield comprising:
   a. an upstanding wall;
   b. mounting means connected to said shield for attachment to the rotary mower for:
      1. providing horizontal movement of said shield, over the ground, in response to horizontal movement of the mower, and for
      2. allowing vertical movement of said shield relative to but independent of vertical movement of the mower; and wherein
   c. said shield is a dome like member and covers the mower except for the manual handle thereof.

2. The combination of claim 1, wherein said shield includes vent openings for admitting outside air to said tool.

3. The combination of claim 1, wherein said implement is a rotary mower and said tool is a cutting blade rotating in a substantially horizontal plane.

4. The combination of claim 3, wherein said mower includes a housing enclosing said blade, said housing having a depending skirt portion enclosing the majority of the periphery of the cutting circle of said blade.

5. The combination of claim 1, wherein said member includes an opening for receiving the handle of said implement.

6. The combination of claim 5, including second shield means covering said handle receiving opening.

7. The combination of claim 1, wherein said member includes an opening for receiving a material conveying chute.

8. The combination of claim 1, wherein said member includes an opening for gaining access to the interior of said member, and a cover for said opening.

9. A rotary mower included in combination with ground engaging safety shield, said shield comprising:
   a. an upstanding wall;
   b. a flange extending laterally outwardly from the lower end of said wall, said flange having a downwardly facing, convexly curved surface providing the ground supporting surface for said shield;
   c. said wall having slot means formed therein communicating with the upper edge of said wall for receiving a portion of the rotary mower;
   d. mounting means connected to said shield for attachment to the rotary mower for
      1. providing horizontal movement of said shield, over the ground, in response to horizontal movement of the mower, and for
      2. allowing vertical movement of said shield independent of the mower; and
   e. said mounting means including cooperating vertically oriented channel means and horizontally oriented pivot pin means,
      said pin means being seated in said channel means,
      said pin means and channel means being vertically movable relative to each other.

10. A rotary mower included in combination with a ground engaging safety shield, said combination comprising:
    a. a mower housing having a depending skirt portion with a lower marginal edge spaced above the ground being traversed,
    b. said shield including a substantially annular wall having front and rear portions located on opposite sides of the transverse center line of said housing and spanning the distance between the lower edge thereof and the ground, wherein said wall and skirt are in laterally spaced apart opposed relationship with said wall disposed outwardly of said skirt;
    c. mounting means connected to said wall and said skirt for providing horizontal movement of said shield, over the ground, in response to horizontal movement of said mower, and allowing vertical movement of said shield relative to but independent of vertical movement of said mower; and
    d. said mounting means including spacer elements located on the front and rear portions of said skirt and on adjacent portions of said wall.

11. A rotary mower having a cutting housing included in combination with a ground engaging safety shield, said shield comprising:
    a. a wall surrounding said cutting housing of the rotary mower;
    b. said wall including a downwardly facing convexly curved surface forming a ground engaging flange around a lower portion of said wall;
    c. said wall having slot means formed therein, communicating with the upper edge of said wall, for receiving a portion of the rotary mower; and
    d. mounting means connected to said shield for attachment to the rotary mower for 1. providing horizontal movement of said shield, over the ground, in response to horizontal movement of the mower, and for
2. allowing vertical movement of said shield independent of the mower.

12. A rotary mower having a cutting housing included in combination with a ground engaging safety shield, said shield comprising:
   a. a wall surrounding said cutting housing of the rotary mower;
   b. said wall including a downwardly facing convexly curved surface forming a ground engaging flange around a lower portion of said wall; and
   c. mounting means connected to said wall for engaging said cutting housing of the rotary mower to limit the downward movement of said shield relative to the mower, said mounting means including a generally horizontal collar portion extending inwardly from said wall surrounding the mower to overlie the mower.

* * * * *